(12) United States Patent
Yun et al.

(10) Patent No.: US 10,128,512 B2
(45) Date of Patent: Nov. 13, 2018

(54) PAPER-BASED MAGNESIUM BATTERY AND THE USE THEREOF

(71) Applicant: North Carolina Agricultural and Technical State University, Greensboro, NC (US)

(72) Inventors: Yeoheung Yun, Greensboro, NC (US); Youngmi Koo, Greensboro, NC (US)

(73) Assignee: North Carolina Agricultural and Technical State University, Greensboro, NC (US)

(*) Notice: Subject to any disclaimer, the term of this patent is extended or adjusted under 35 U.S.C. 154(b) by 221 days.

(21) Appl. No.: 15/301,111

(22) PCT Filed: Apr. 15, 2015

(86) PCT No.: PCT/US2015/025961
§ 371 (c)(1),
(2) Date: Sep. 30, 2016

(87) PCT Pub. No.: WO2015/160944
PCT Pub. Date: Oct. 22, 2015

(65) Prior Publication Data
US 2017/0018784 A1 Jan. 19, 2017

Related U.S. Application Data

(60) Provisional application No. 62/046,724, filed on Sep. 5, 2014, provisional application No. 61/979,834, filed on Apr. 15, 2014.

(51) Int. Cl.
*H01M 6/32* (2006.01)
*H01M 6/40* (2006.01)
(Continued)

(52) U.S. Cl.
CPC .............. *H01M 6/32* (2013.01); *H01M 4/06* (2013.01); *H01M 4/38* (2013.01); *H01M 6/12* (2013.01);
(Continued)

(58) Field of Classification Search
CPC ........ H01M 4/0414; H01M 4/06; H01M 4/38; H01M 6/12; H01M 6/22; H01M 6/32;
(Continued)

(56) References Cited

U.S. PATENT DOCUMENTS

| 4,020,247 A | 4/1977 | Birt et al. |
| 4,142,028 A | 2/1979 | Leger et al. |

(Continued)

FOREIGN PATENT DOCUMENTS

| CN | 03268948 A | 8/2013 |
| WO | WO 2006/028347 A1 | 3/2006 |
| WO | WO 2015/160944 A1 | 10/2015 |

OTHER PUBLICATIONS

Chen et al., "Portable and Self-Powered Paper-Based Electrophoretic Microfluidic Devices," 17th International Converence on Miniaturized Systems for Chemistry and Life Sciences, pp. 1583-1585 (Oct. 2013).

(Continued)

*Primary Examiner* — Brittany L Raymond
(74) *Attorney, Agent, or Firm* — Jenkins, Wilson, Taylor & Hunt, P.A.

(57) ABSTRACT

The present application relates generally to paper-based magnesium batteries, and the manufacture and use thereof, such as in wearable or point of care devices.

24 Claims, 5 Drawing Sheets

(51) Int. Cl.
*H01M 4/06* (2006.01)
*H01M 4/38* (2006.01)
*H01M 6/12* (2006.01)
*H01M 6/22* (2006.01)
*H01M 4/04* (2006.01)
*H01M 6/46* (2006.01)

(52) U.S. Cl.
CPC ............... *H01M 6/22* (2013.01); *H01M 6/40* (2013.01); *H01M 4/0414* (2013.01); *H01M 6/46* (2013.01); *H01M 2220/30* (2013.01); *H01M 2300/0002* (2013.01)

(58) Field of Classification Search
CPC ...... H01M 6/40; H01M 6/46; H01M 2220/30; H01M 2300/0002
See application file for complete search history.

(56) References Cited

U.S. PATENT DOCUMENTS

2005/0214635 A1 9/2005 Lee
2006/0216586 A1 9/2006 Tucholski
2011/0097623 A1 4/2011 Marinis, Jr. et al.

OTHER PUBLICATIONS

Hu et al., "Highly conductive paper for energy-storage devices," PNAS, pp. 1-5 (2009).
Koontz et al., "Magnesium Water-Activated Batteries," Handbook of Batteries, Third Edition, Chapter 17, pp. 17.1-17.21 (2002).
Hyun et al., "Foldable Graphene Electronic Circuits Based on Paper Substrates," Advanced Materials, vol. 25, pp. 4729-4734 (2013).
Lee et al., "Two-step activation of paper batteries for high power generation: design and fabrication of biofluid- and water-activated paper batteries," J. Micromech, Microeng., vol. 16, pp. 2312-2317(Sep. 2006).
Lee et al., "Water Activated Dispoable and Long Shelf Life Microbatteries", Procedings of the IEEE International Conference on Micro Electro Mechanical Systems (MEMS), pp. 387-390 (Feb. 2003).
Lee et al., "Wearable Textile Battery Rechargeable by Solar Energy," Nano Letters, pp. 5753-5761 (Oct. 28, 2013).
Notification Concerning Transmittal of Copy of International Preliminary Preport on Patentability corresponding to to International Patent Spplication No. PCT/US2015/025961 dated Apr. 15, 2014.
Notification of Transmittal of the International Search Report and the Written Opinion of the International Searching Authority, or the Declaration corresponding to International Patent Spplication No. PCT/US2015/025961 dated Sep. 17, 2015.
Sammoura et al., "Water-activated disposable and long shelf life microbatteries," Sensors and Actuators A, vol. 111, pp. 79-86 (2004).
Thom et al., ""Fluidic batteries" as low-cost sources of power in paper-based microfluidic devices," The Royal Society of Chemistry, vol. 12, pp. 1768-1770 (2012).

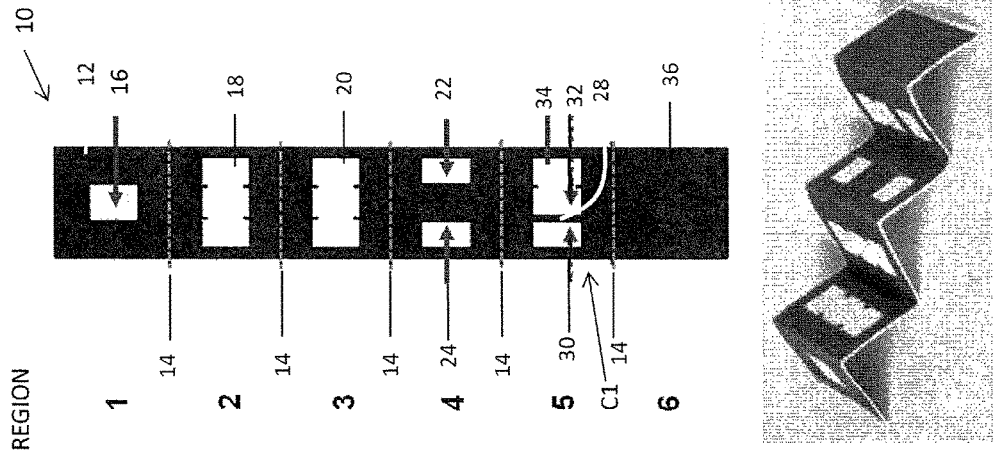

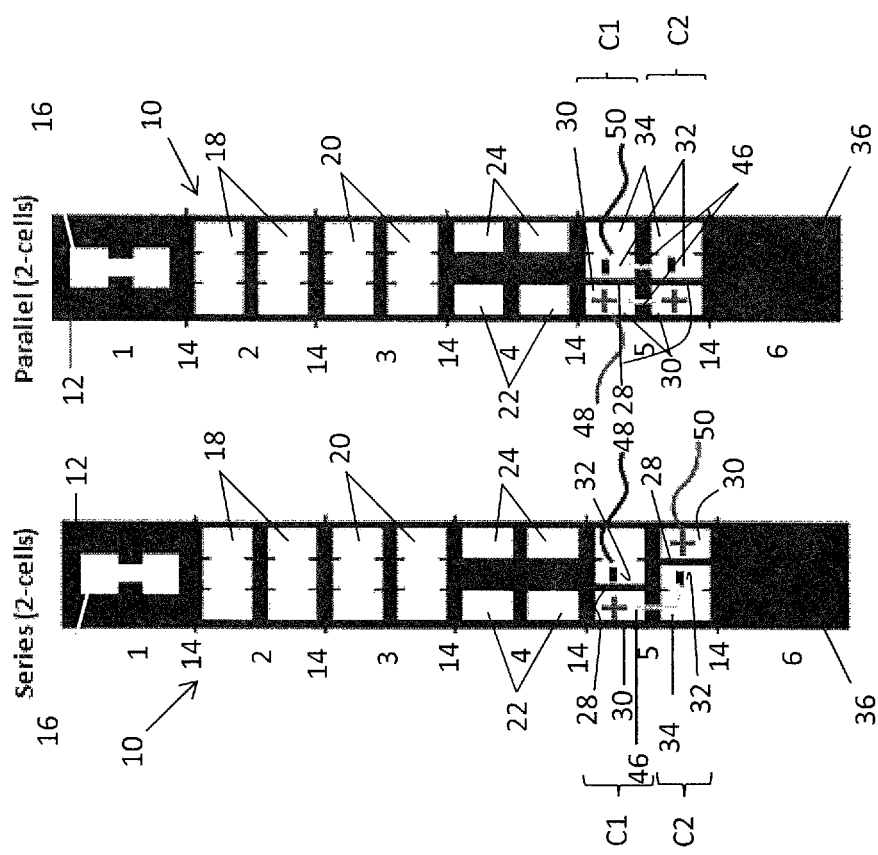

PAPER-BASED MAGNESIUM BATTERY AND THE USE THEREOF

RELATED APPLICATIONS

This application claims priority under 35 U.S.C. § 119(e) to U.S. Provisional Patent Application Ser. Nos. 61/979,834, filed Apr. 15, 2014 and 62/046,724, filed Sep. 5, 2014, the disclosure of each of which is incorporated herein by reference in its entirety.

TECHNICAL FIELD

The presently disclosed subject matter relates generally to paper-based magnesium batteries, and the manufacture and use thereof, such as in wearable or point of care ('POC') devices.

BACKGROUND

Devices that are either wearable or can be incorporated into point of care diagnostics and/or therapeutics are preferably inexpensive and disposable, as well as lightweight, flexible, and readily manufactured. Achieving such properties, as well as appropriate uses and streamlined manufacture of such devices, are active areas of research. One limitation facing POC device manufacturers is providing power appropriate to the needs of the device, while at the same time minimizing or eliminating the use of expensive or toxic materials.

SUMMARY

The presently disclosed subject matter relates generally to paper-based magnesium batteries, the manufacture and use thereof.

A paper-based battery is disclosed, which in some embodiments comprises: a paper substrate adapted to receive a liquid; and a cell comprising a magnesium anode disposed on the paper substrate and a cathode disposed on the paper substrate; wherein the magnesium anode and the cathode are separated from and coplanar with each other, wherein upon application of a liquid to the paper substrate the magnesium anode, the cathode and the liquid are capable of generating an electric current and wherein the battery has a power density of at least about 1 mW/cm$^2$ after application of a liquid. In some embodiments, the paper substrate comprises a hydrophobic zone and a hydrophilic zone.

In some embodiments, the paper substrate comprises one or more folds. In some embodiments, the magnesium anode and the cathode are coplanar on a region of the paper substrate bounded by one or more folds. In some embodiments, the folded paper substrate contains at least three folds.

In some embodiments, the paper substrate comprises a zone loaded with an electrolyte. In some embodiments, the region loaded with electrolyte is in a path of travel of a liquid to the magnesium anode and the cathode. In some embodiments, the paper substrate comprises a hydrophobic zone and a hydrophilic zone loaded with an electrolyte. In some embodiments, the electrolyte comprises metal ions corresponding to the cathode and anode, optionally in combination with inorganic salts. In some embodiments, the electrolyte is selected from the group comprising $MgF_2$, $MgCl_2$, $MgBr_2$, $MgI_2$, $MgClO_4$, $Mg(C_2H_3O_2)_2$, $Mg(HCO_3)_2$, $Mg(OH)_2$, $Mg(MnO_4)_2$, $Mg(ClO_3)_2$, $MgCO_3$, $MgCrO_4$, $MgCr_2O_7$, $MgSO_4$, $Mg_3(PO_4)_2$, $Mg(NO_3)_2$, AgF, AgCl, AgBr, AgI, $AgC_2H_3O_2$, $AgHCO_3$, AgOH, $AgNO_3$, $AgMnO_4$, $AgClO_3$, CuF, CuCl, CuBr, CuI, $CuF_2$, $CuCl_2$, $CuBr_2$, $CuI_2$, $PtCl_2$, AuCl, KCl, NaCl and combinations thereof.

In some embodiments, the cathode comprises a material selected from the group comprising silver, copper, platinum, gold and carbon-based material. In some embodiments, the carbon-based material comprises activated carbon, graphene, carbon nanotubes, carbon paste, glassy carbon paste and/or glassy carbon.

In some embodiments, the paper substrate comprises a zone loaded with an oxidation agent for magnesium metal. In some embodiments, the oxidation agent is selected from the group comprising $BaCrO_4$, $MnO_2$, PbO, $KMnO_4$, FeO, $PbCrO_4$, $SnO_2$, $Bi_2O_3$ and combinations thereof.

In some embodiments, the liquid is water or an aqueous solution. In some embodiments, the aqueous solution comprises a biological or non-biological fluid or a combination thereof. In some embodiments, the biological fluid is selected from the group comprising urine, blood-related samples, sputum, cerebral spinal fluid, interstitital fluid, bronchoalveolar lavage, lymph fluid, bone marrow fluid, ascetic fluid, exudative fluid, amniotic fluid, expectorated sputum, saliva, semen, bile, pancreatic fluid and combinations thereof. In some embodiments, the blood-related sample comprises whole blood, serum, or plasma.

In some embodiments, the longest dimension of the magnesium anode is no more than about 10 mm. In some embodiments, the battery has an open circuit potential of more than 1.5 V for a single cell. In some embodiments, the battery does not contain a salt bridge. In some embodiments, the battery further comprises a region for conducting a reaction. In some embodiments, the battery further comprises one or more additional cells connected to the first cell in-series or in-parallel.

In some embodiments, a device comprising the paper-based battery is provided.

Also provided is a method of making a paper-based battery. In some embodiments, the method comprises providing a paper substrate adapted to receive a liquid; and disposing magnesium and a cathode material on the paper substrate to form a cell comprising a magnesium anode and a cathode, wherein the magnesium anode and the cathode are separated from and coplanar with each other, wherein upon application of a liquid to the paper substrate the magnesium anode, the cathode and the liquid are capable of generating an electric current and wherein said battery has a power density of at least about 1 mW/cm$^2$ after application of a liquid.

Accordingly, it is an object of the presently disclosed subject matter to provide paper-based magnesium battery, devices using the same, and methods of making and using the same. This and other objects are achieved in whole or in part by the presently disclosed subject matter.

These and other objects and aspects of the presently disclosed subject matter will become apparent to those skilled in the art after a reading of the following description of the disclosure when considered with the drawings.

BRIEF DESCRIPTION OF THE DRAWINGS

FIG. 1a is a schematic representation and digital image of a wax-printed origami (paper folding) battery; and FIGS. 1b and 1c are each a schematic representation of an in-series (FIG. 1b) and an in-parallel (FIG. 1c) alignment of a two cell battery, when viewed from a reverse surface of the battery, i.e. the connections as well as wires coming off the electrode are on the reverse side—they are not touching the electrodes but instead are attached to the underlying paper substrate, that is, attached to the paper substrate on the other side of the metal electrodes.

Figure 2A:
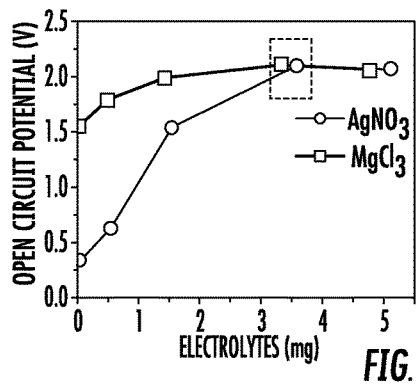
FIG. 2a is a graph of the effect of electrolytes (AgNO$_3$, open circles; MgCl$_2$, open squares) on the open circuit potential of a galvanic cell.

It will be understood that the drawings are for the purpose of describing embodiments of the presently disclosed subject matter and are not intended to limit the presently disclosed subject matter thereto.

DETAILED DESCRIPTION

This description is not intended to be a detailed catalogue of all the ways in which the presently disclosed subject matter may be implemented or of all the features that may be added to the presently disclosed subject matter. For example, features illustrated with respect to one embodiment may be incorporated into other embodiments, and features illustrated with respect to a particular embodiment may be deleted from that embodiment. Thus, one or more of the method steps included in a particular method described herein may, in other embodiments, be omitted and/or performed independently. In addition, numerous variations and additions to the embodiments suggested herein, which do not depart from the instantly disclosed subject matter, will be apparent to those skilled in the art in light of the instant disclosure. Hence, the following description is intended to illustrate some particular embodiments of the presently disclosed subject matter, and not to exhaustively specify all permutations, combinations and variations thereof. It should therefore be appreciated that the presently disclosed subject matter is not limited to the particular embodiments set forth herein. Rather, these particular embodiments are provided so that this disclosure will more clearly convey the full scope of the presently disclosed subject matter to those skilled in the art.

The terminology used herein is for the purpose of describing particular embodiments of the presently disclosed subject matter only and is not intended to limit the presently disclosed subject matter. Although the following terms are believed to be well understood by one of skill in the art, the following definitions are set forth to facilitate understanding of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art.

As used herein, the terms "a" or "an" or "the" may refer to one or more than one. For example, "a" voltage can mean one voltage or a plurality of voltages.

As used herein, the term "about," when used in reference to a measurable value such as an amount of time, temperature, voltage, current, power, size, thickness, area, concentration and the like, is meant to encompass variations of +/−20% of the specified amount. All ranges set forth, unless otherwise stated, include the stated endpoints and all increments between.

As used herein, the term "and/or" refers to and encompasses any and all possible combinations of one or more of the associated listed items, as well as the lack of combinations when interpreted in the alternative ("or").

In some embodiments, disclosed herein is a paper-based fluidic galvanic cell using magnesium as an anode in a paper device. A galvanic cell in accordance with the presently disclosed subject matter, with the addition of water, provides sufficient power with a targeted potential/current for a period of time, which is influenced directly by the presence of an aqueous solution, such as water, in the system. This time-limited activity means that the magnesium paper-based battery can be used as part of a wearable and/or disposable device for emergency power supply and/or for the monitoring/diagnosing of diseases, drug abuse, bacterial contamination, viral contamination, and other ailments, as well as for the monitoring, analysis or warning of biological/chemical pollution.

As used herein, "paper" as used in "paper-based" or in "paper substrate" generally refers to a porous, hydrophilic medium, including but not limited to cellulosic paper, filter paper, tissue paper, writing paper, paper towel, cloth, and porous polymer film, chromatographic paper, toilet paper, newspaper, or polymer film such as nitrocellulose acetate and cellulose acetate. In some embodiments, a liquid can flow through the paper substrate via capillary action.

As used herein "origami" or "folded" refers to a single piece of paper containing a minimum of one fold. Generally, origami paper batteries disclosed herein have at least about two folds in a single piece of paper. In some embodiments, the paper is folded at least about three times, or at least about four times, or at least about five times, or at least about six times, or at least about seven times, or at least about eight times, or at least about nine times, or at least about ten times, or at least about eleven times, or at least about twelve times, or at least about thirteen times, or at least about fourteen times, or at least about fifteen times.

Referring now to the Figures, wherein like reference numerals refer to like parts throughout, and referring particularly to FIGS. 1a-1c and FIG. 3a, an origami paper battery 10 in accordance with the presently disclosed subject matter comprises a paper substrate 12 containing five folds 14, which define regions 1, 2, 3, 4, 5 and 6. Paper substrate 12 comprises a hydrophilic material and a series of hydrophilic zones 16, 18, 20, 22 and 34. Region 1 contains a hydrophilic zone 16 at which a liquid (such as water or other aqueous solution) can be applied; hence, hydrophilic zone 16 can also be referred to as liquid loading zone 16. Regions 2 and 3 contain open hydrophilic zones 18 and 20, where materials can be applied or not applied, depending on the intended use of battery 10. The presence of extra regions or zones relates to the length of paper substrate 12. In additional to providing additional regions to accommodate application of materials if desired, the extra length provided by the extra regions accommodates more liquid, which can enhance battery life. Region 4 comprises two electrolyte zones 22 and 24 to the far right and far left sides of region 4, respectively. In this embodiment, two different electrolyte solutions are applied, $MgCl_2$ to zone 22 and $AgNO_3$ to zone 24. Region 5 contains the two electrodes 30 and 32, separated by hydrophobic (e.g., wax) boundary 28. In this embodiment, cathode 30 (in this case a silver cathode) is oriented to the left side of paper substrate 12 and magnesium anode 32 is oriented to the right side of paper substrate 12. Hence, two different electrolyte solutions are applied, $MgCl_2$ to zone 22 and $AgNO_3$ to zone 24, as discussed above, to facilitate flow of these electrolyte compositions to the respective electrodes. Zone 34 is also present in Region 5, and after application of liquid to the system, it can receive an oxidation agent for magnesium metal, such as $BaCrO_4$. Alternatively or in addition, the oxidation agent can be present, such as pre-loaded, in Region 5, before liquid is applied. Region 6 is provided for convenience to facilitate handling of battery 10 and can comprise a hydrophobic material 36 if desired.

When an origami paper battery contains three folds, region 1, region 2, region 4 and region 5 are each present, per FIGS. 1a-1c and 3a. Such an embodiment can be employed when a relatively "heavy weight" filter paper is used and an equivalent of region 3 is not necessary for additional water retention. In an embodiment where an origami paper battery contains four folds, region 1, region 2, region 3, region 4 and region 5 are present and each individually comprise one region or, in an alternate example, region 1, region 2, region 4, region 5 and region 6 are present and each individually comprise one region. When an origami paper battery contains five folds, in one embodiment as shown in FIG. 1a, each of region 1, region 2, region 3, region 4, region 5 and region 6 are present. In a separate embodiment, when an origami paper battery contains five folds, each of region 1, two region 2s, region 3, region 4, and region 5 are present. Multiple such configurations can be prepared, depending on the needs of the system, such as when more than five folds are present, such as six folds in which each of region 1, two region 2s, region 3, region 4, region 5 and region 6 are each present.

Figure 3A:
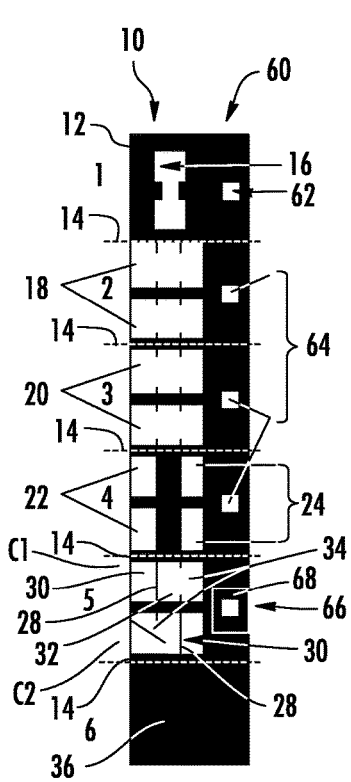
FIG. 3a shows an origami design for paper-based device comprising a battery (two galvanic cells in-series connection), a UV-LED and fluorescent assay components prepared according to the methods disclosed herein.

Reference is now made to FIGS. 1b, 1c, and 3a. In FIGS. 1b and 1c, embodiments of battery 10 are shown from a bottom or rear view, while in FIG. 3a, an embodiment of battery 10 is shown from a top or front view. FIGS. 1b and 3a shows battery cells C1 and C2 connected in series, while FIG. 1c shows battery cells C1 and C2 connected in parallel. Cells C1 and C2 and respectively comprise cathodes 30 and magnesium anodes 32. Cells C1 and C2 are connected to each other via a wire (such as a silver wire) 46, again on the rear surface of battery 10 (best seen in FIGS. 1b and 1c). In view of the inclusion of a second cell C2, battery 10 comprises additional hydrophilic zones 18 and 20, additional electrolyte zones 22 and 24, and additional oxidation agent zones 34. As best seen in FIGS. 1b and 1c, battery 10 further comprises conductive wires 48 and 50, which are adapted to connect to a device of interest (not shown in FIGS. 1b and 1c; LED 66 in FIG. 3a).

As used herein, the surfaces of the porous hydrophilic medium are generally patterned using a hydrophobic material, which provides a substantially impermeable barrier throughout the thickness of the porous, hydrophilic medium when applied thereto. The hydrophobic barrier is typically wax, but can also be a hydrophobic polymer, such as a curable polymer, poly(dimethyl-siloxane), a photoresist, poly(methylmethacrylate), an acrylate polymer, polystyrene, polyethylene, polyvinylchloride, a fluoropolymer, or a photo-polymerizable polymer.

A "salt bridge" is often employed in batteries to provide ionic balance (electrical neutrality) between two half-cells with different electrolytes, yet typically the bridge prevents the solutions from mixing and causing unwanted side reactions. In some embodiments of the presently disclosed subject matter, the origami paper-based magnesium battery permits direct contact (and mixing) between the two half-cells and no salt bridge is employed.

In some embodiments, magnesium is employed as an anode. Employing magnesium provides a paper-based magnesium battery activated by water that provides in some embodiments a power density, such as a theoretical or calculated power density of at least about 1.0 $mW/cm^2$, or in some embodiments of at least about 2.0 $mW/cm^2$, or in some embodiments of at least about 3.0 $mW/cm^2$ for a single cell. Multiple galvanic cells are employed when more power is required by a device/system.

The paper-based batteries disclosed herein can be incorporated into wearable devices as well as point of care devices such as a biosensor, a chemical sensor, an active filter, and an emergency power patch.

As disclosed herein, the cathode can be silver, copper, platinum, gold or carbon-based, including but not limited to electrodes based on activated carbon, graphene, carbon nanotubes, carbon paste, glassy carbon paste, and glassy carbon. Substitution of one cathode material for another in the origami paper-based battery or cell can be made by one or ordinary skill in the art upon a review of the present disclosure.

Typically, each of the cathode and the anode has dimensions that are independently configured. The current of the battery can be varied by increasing the area of a given anode/cathode combination. In one embodiment, the length and/or width of either the cathode and/or the anode is no longer than about 20.0 mm, no longer than about 18.0 mm, no longer than about 16.0 mm, no longer than about 14.0 mm, no longer than about 12.0 mm, no longer than about 10.0 mm, no longer than about 9.5 mm, no longer than about 9.0 mm, no longer than about 8.5 mm, no longer than about 8.0 mm, no longer than about 7.5 mm, no longer than about 7.0 mm, no longer than about 6.5 mm, no longer than about 6.0 mm, no longer than about 5.5 mm, no longer than about 5.0 mm, no longer than about 4.5 mm, no longer than about 4.0 mm, no longer than about 3.5 mm, no longer than about 3.0 mm, no longer than about 2.5 mm, no longer than about 2.0 mm, no longer than about 1.5 mm, or no longer than about 1.0 mm. Typically, the thickness, or height of the anode, in some embodiments a magnesium anode, and/or the cathode is independently not more than about 1.0 mm, no more than about 0.9 mm, no more than about 0.8 mm, no more than about 0.7 mm, no more than about 0.6 mm, no more than about 0.5 mm, no more than about 0.4 mm, no more than about 0.3 mm, no more than about 0.2 mm, or no more than about 0.1 mm. Variations of the sizes of each of the cathode and the anode can be optimized for the particular needs of the system.

The electrodes are affixed to the paper substrate, such as by using an adhesive. Representative adhesives include but are not limited to a liquid, paste, tape, film, or shaped solid.

As disclosed herein, the batteries of the present application can include electrolytes. Electrolytes disclosed herein generally contain metal ions corresponding to the cathode and anode, optionally in combination with inorganic salts, such as NaCl or KCl. Typical magnesium-containing electrolytes include, but are not limited to $MgF_2$, $MgCl_2$, $MgBr_2$, $MgI_2$, $MgClO_4$, $Mg(C_2H_3O_2)_2$, $Mg(HCO_3)_2$, $Mg(OH)_2$, $Mg(MnO_4)_2$, $Mg(ClO_3)_2$, $MgCO_3$, $MgCrO_4$, $MgCr_2O_7$, $MgSO_4$, $Mg_3(PO_4)_2$, $Mg(NO_3)_2$ and combinations thereof. Typical silver-containing electrolytes include, but are not limited to $AgF$, $AgCl$, $AgBr$, $AgI$, $AgC_2H_3O_2$, $AgHCO_3$, $AgOH$, $AgNO_3$, $AgMnO_4$, $AgClO_3$ and combinations thereof. Typical copper-containing electrolytes include, but are not limited to $CuF$, $CuCl$, $CuBr$, $CuI$, $CuF_2$, $CuCl_2$, $CuBr_2$, $CuI_2$ and combinations thereof. Typical platinum-containing electrolytes include, but are not limited to $PtCl_2$. Typical gold-containing electrolytes include, but are not limited to $AuCl$. Typical electrolytes used with a carbon-based cathode include, but are not limited to chloride salts such as KCl or NaCl.

In addition to the electrolytes listed above, the preparation of a galvanic cell optionally includes an oxidation agent for magnesium metal, including but not limited to $BaCrO_4$, $MnO_2$, $PbO$, $KMnO_4$, $FeO$, $PbCrO_4$, $SnO_2$, $Bi_2O_3$ and combinations thereof. Generally, the oxidation agent is used to inhibit local corrosion of the magnesium surface and to improve the galvanic current flow by reacting with and/or removing pollutants from the magnesium surface, thereby exposing pure metal. Typically, the oxidation agent reacts with species such as magnesium oxide, as well as hydroxide-containing species on the surface of the cathode. In one variation, the battery can be manufactured without an oxidation agent, for example to provide power to a system requiring less than 6 hours of power. In another variation, the oxidation agent can be added to a battery that is to be used for any length of time, for example between at least about 30 minutes and at least about 12 hours. The amount of oxidation agent relative to the amount of the magnesium metal electrode is typically small, for example, between about 0.25 and about 5 µL of a 2 mM solution, or between about 0.5 and about 2.5 µL of a 2 mM solution, such as for example about 1 µL of a 2 mM solution. Other amounts of solutions with varying concentration of agent can be easily calculated and employed.

Generally, the solutions described above (electrolyte and oxidation agent) are applied to the hydrophilic region of the paper substrate after application of the hydrophobic barrier. Each solution is dried after application, so that when the electrodes are affixed to the appropriate hydrophilic region of the paper substrate (see for example FIGS. 1a through 1c and FIG. 3), the paper itself is dry.

As shown in FIG. 1a, the origami design of the paper-based battery yields an arrangement in which the cathode and anode are coplanar (in some embodiments side-by-side) on the same region or same piece of paper, as opposed to, for example, being in a layered configuration. The coplanar configuration of the electrodes addresses shortcomings of a cathode layered on top of an anode—in such a system, the added water (and by extension the dissolved electrolytes) are difficult to distribute evenly through the system. Additionally, in a 'stacked' system, the small space between the cathode and anode can lead to uneven current flow, which can further lead to a short in the system.

After folding, the paper substrate is typically held in place by the application of an adhesive to the hydrophobic region. Representative types of adhesive are described above, but are typically a glue. Alternately, a clip or clamp can be used at the edge of the folded paper substrate to hold the system.

Using a silver/magnesium system as an example, the electrochemical reaction for the water-operated paper fluidic battery at the magnesium anode (oxidation) and silver cathode (reduction) are represented by Equations (1) and (2), respectively:

$$\text{Anode } Mg \rightarrow Mg^{2+} + 2e^- \tag{1}$$

$$\text{Cathode } 2AgNO_3 + 2e^- \rightarrow 2Ag + 2NO_3^- \tag{2}$$

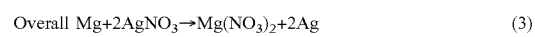

$$\text{Overall } Mg + 2AgNO_3 \rightarrow Mg(NO_3)_2 + 2Ag \tag{3}$$

Because magnesium is an active material, a side reaction between the Mg anode and water may occur according to the following equation:

$$Mg + 2H_2O \rightarrow Mg(OH)_2 + H_2 \tag{4}$$

Generally, the galvanic cells or batteries of the present application are activated by the addition of water, but other aqueous solutions, including biological or non-biological fluids, are also effective activators. Biological fluids include, but are not limited to, urine, blood-related samples (e.g., whole blood, serum, plasma, and other blood-derived samples), sputum, cerebral spinal fluid, interstitial fluid, bronchoalveolar lavage, lymph fluid, bone marrow fluid, ascitic fluid, exudative fluid, amniotic fluid, expectorated sputum, saliva, semen, bile, pancreatic fluid and the like. Other solvents, such as ionic liquids, are also effective activators of galvanic cells, as familiar to those of skill in the art.

As disclosed herein, a single drop of water (for example, about 80 µL), can maintain a battery potential for at least about 30 minutes or up to about 1 hour. Repeated additions of individual drops of an aqueous solution, such as water, lead to a recovery of system performance, wherein the battery potential is maintained for up to at least about 1 hour each, for up to at least about 2 hours, up to at least about 3 hours, up to at least about 4 hours, up to at least about 5 hours, or up to at least about 6 hours, or at least about 7 hours, or at least about 8 hours, or at least about 9 hours, or at least about 10 hours, or at least about 11 hours, or at least about 12 hours, or at least about 24 hours, or at least about 36 hours. Typically, one limitation to the system performance is dissolution of the magnesium metal electrode.

Based on the standard reduction potential difference between two representative electrodes, magnesium (−2.37 V), and silver (+0.80 V), the theoretical potential of a Mg/Ag paper-based galvanic cell is 3.17 V. As disclosed herein, the experimental potential for a single Mg/Ag paper-based galvanic cell was found to be 2.20 V. Without being bound by theory, the formation of magnesium hydroxide on the magnesium surface and/or ohmic polarization based on solution resistance can contribute to a decreased experimental potential compared to the theoretical calculation. Varying the paper design, such as, for example, the size of the hydrophilic region, and optimizing the electrolyte identity and concentration, as well as varying the size of the electrodes can mitigate decreases in potential.

Figure 5:
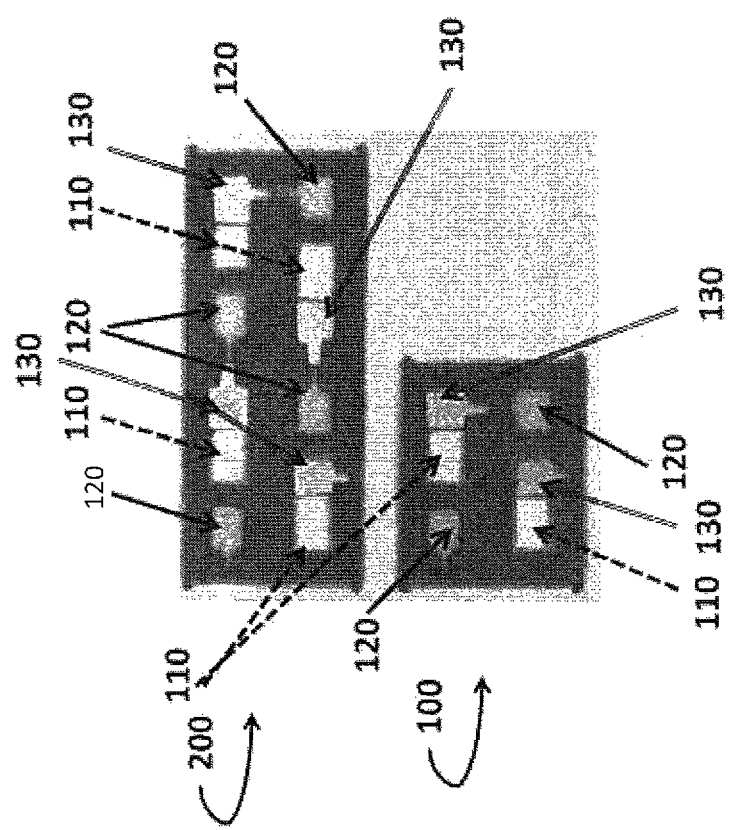
FIG. 5 is a digital image of electron beam deposited copper and magnesium on filter paper with a wax mask.

Based on the origami design disclosed herein, any combination of in-series or in-parallel connections of galvanic cells is possible (see FIG. 1b, FIG. 3a, or FIG. 5). Batteries can be built using combinations of galvanic cells, configured either in-series or in-parallel, and can be arranged vertically or horizontally. Increasing the number of galvanic cells in the system is one approach used to increase power provided by a battery. The voltage of a battery can be controlled in manufacturing by varying the number of electrodes.

In some embodiments, the width x length of the batteries of the present application are designed to be small. As exemplified herein, the origami paper design and methods of manufacture yield batteries having overall dimensions of about 20 mm×20 mm×1 mm, for example, a length of 20.00 mm, a width of 20.00 mm and a thickness of 1.00 mm. Alternate sizes can be readily provided, based on the number of folds of paper, as well as the number of in-series or in-parallel cells used in each battery. In one variation, the overall size of a magnesium-paper based battery is 40 mm×40 mm×2 mm or alternately is 20 mm×40 mm by no more than 2 mm. In variation of any embodiment or aspect disclosed herein, the length and width of the battery vary independently. In one embodiment, the length and/or width is no longer than about 100 mm, or no longer than about 90 mm, or no longer than about 80 mm, or no longer than about 70 mm, or no longer than about 60 mm, or no longer than about 50 mm, or no longer than about 40 mm, or no longer than about 30 mm, or no longer than about 20 mm, or no longer than about 10 mm. Typically, the thickness, or height of the battery is not more than about 10 mm, no more than about 9 mm, no more than about 8 mm, no more than about 7 mm, no more than about 6 mm, no more than about 5 mm, no more than about 4 mm, no more than about 3 mm, no more than about 2 mm, or no more than about 1 mm. The paper-based batteries prepared herein are small, as well as flexible. The batteries can be incorporated into small devices, including those that are wearable.

As disclosed herein in one example, a paper-based battery was incorporated into a chip containing a UV-LED and fluorescent assay components. Alkaline phosphatase (ALP), an indicator of diseases including, but not limited to liver disease, liver cancer, hepatitis, bone disease, osteoblastic bone cancer, and kidney cancer, was detected using a paper-based point of care device and a smart phone's application software.

Alternately, a paper-based battery of the present application can be used to provide power to electrochemical sensors, including biological sensors such as glucose monitors, as well as chemical sensors, such as those monitoring the presences of toxins, water contaminates, etc.

A paper-based battery of the present application is also incorporated into a chip providing an emergency power supply that can be incorporated into a wearable device.

EXAMPLES

The following examples are for illustrative purposes only and are not intended to be a detailed catalogue of all the different ways in which the presently disclosed subject matter may be implemented or of all the features that may be added to the presently disclosed subject matter. One skilled in the art will appreciate that the following Examples are exemplary and that numerous changes, modifications, and alterations can be employed without departing from the scope of the presently disclosed subject matter.

Materials

Chemicals, magnesium chloride ($MgCl_2$, pure, ACROS Organics, Geel, Belgium), silver nitrate ($AgNO_3$, 99%, ACROS Organics, Geel, Belgium), and barium chromate ($BaCrO_4$, 99.998%, Alfa Aesar, Ward Hill, Mass., United States of America) were used as received. Chromatographic cellulose filter paper (Whatman grade 1, 0.18 mm thickness), a red LED (RadioShack, Greensboro, N.C., United States of America), glue stick and polypropylene (PP) film (both from 3M, Saint Paul, Minn., United States of America), and a conductive pen, CircuitWriter™ (CAIG Laboratories, Poway, Calif., United States of America) were used in the construction of the battery. For the disclosed fluorescence assay, an endogenous phosphatase detection kit (ELF 97 Phosphatase detection kit, E6601, Life Technologies, Carlsbad, Calif., United States of America), phosphatase (Alkaline from bovine intestinal mucosa, Sigma Aldrich, St. Louis, Miss., United States of America), and 365 nm UV-LED (NSSU100C, Nichia, Tokushima, Japan) were employed.

Example 1

Paper-Based Galvanic Cell Fabrication Type I

Electrode Preparation

Magnesium foil (99.5% purity, 2.50 mm wide and 0.15 mm thick, Alfa Aesar, Ward Hill, Massachusetts, United States of America) was treated with chromate solution (ASTM G1-03-E, Standard Practice for Preparing, Cleaning and Evaluating Corrosion Test Specimens, C.5.1) to remove corrosion products and the metal surface was then polished sequentially with 600, 800, 1000 and 1200 grit silicon carbide sandpaper, followed by washing with ethanol and drying with nitrogen stream. Final dimensions of the magnesium anode: 2.50 mm×6.50 mm×0.10 mm. The polished magnesium foil was stored in a desiccator until use.

Silver foil (0.10 mm thickness, 99.998% pure, annealed, Alfa Aesar, Ward Hill, Massachusetts, United States of America) was polished according to the method for Mg foil; the final dimensions of the silver cathode: 2.50 mm×6.50 mm×0.08 mm.

Cell Preparation

Wax printing technology was used to fabricate paper-based fluidic galvanic cell devices. A design was created using AutoCAD™ software (available from Autodesk, Inc., San Rafael, Calif., United States of America) and then printed onto filter paper using a wax printer (ColorQube 8570, Xerox, Norwalk, Conn., United States of America). The printed devices were placed on a hot plate (123° C.) for about 5 minutes, which caused the wax to permeate throughout the paper, forming the 3-dimensional hydrophobic barriers used to control liquid flow (FIG. 1a).

Specific amounts, described below, of silver nitrate ($AgNO_3$) and magnesium chloride ($MgCl_2$) were deposited onto the hydrophilic zones 24 and 22 respectively as electrolyte for each of the half-cells, as specified in FIGS. 1a-1c. Barium chromate ($BaCrO_4$), an oxidation agent of magnesium metal, was also deposited, 1 μL of 2 mM solution, as indicated in zone 34. Each solution was dried in sequence before the addition of the others. Alternately, a second solution can be applied to the hydrophilic zones before the solution of the prior application is dry, as long as the two solutions do not chemically react.

Affixing Electrodes

Treated magnesium foil (prepared above) was used as the anode electrode and the treated silver foil (prepared above)

was used as the cathode electrode in the galvanic cell. The electrodes were affixed to the filter paper using an adhesive tape attached to the bottom layer of filter paper before folding and attaching the filter paper layers to one another using glue applied to the wax surface (FIGS. 1a-1c). The assembled paper-based battery chip was pressed using a three pound block for half a day. The battery did not require a separately configured salt bridge. The battery's overall dimensions were 20.00 mm wide×20.00 mm long×1.00 mm thick and the total weight was 0.50 g.

Galvanic Cell Performance

Performance of the paper-based fluidic galvanic cell was investigated using a Gamry Potentiostat/Galvanostat (Model: Reference 600, software: PWR 800, Gamry Instruments, Warminster, Pennsylvania, United States of America). Particularly, the open circuit potential and discharge curves were determined. All experiments were conducted in an aluminum Faraday cage. Discharge curves of the paper-based fluidic galvanic cell were obtained using a constant load of current. The performances for red LED and UV-LED power output were also evaluated. The current and voltage were measured simultaneously using a Fluke 177 True RMB multimeter (Fluke Corporation, Everett, Wash., United States of America).

FIGS. 2a through 2e show the performance results of a paper-based fluidic galvanic single cell. As shown in FIG. 2a, the amounts of the electrolytes were optimized to maximize the open circuit potential of the specified design; the final optimized amount for the single cell described herein was 3.33 mg $MgCl_2$ and 3.57 mg $AgNO_3$ (dashed-line box in FIG. 2a).

Figure 2B:
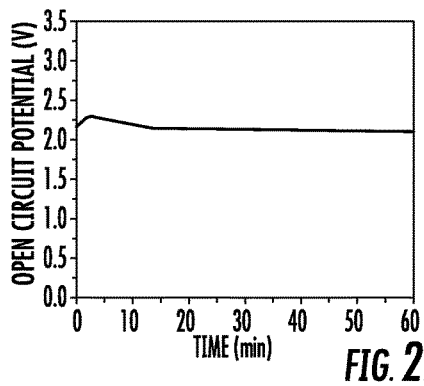
FIG. 2b is a graph of the open circuit potential of single galvanic cell over time.
Figure 2C:
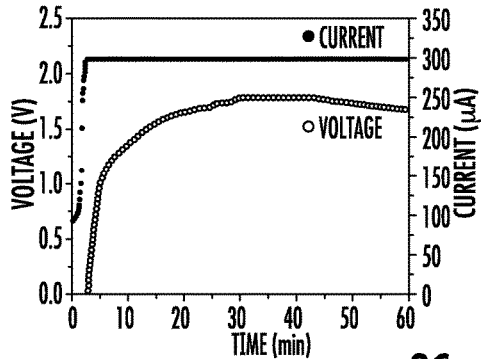
FIG. 2c is a discharge curve over time at constant current (300 µA)(current, solid circles; voltage, open circles)
Figure 2D:
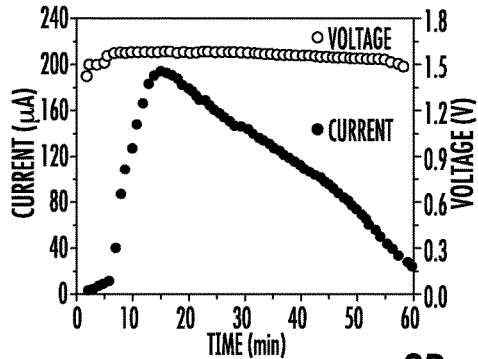
FIG. 2d is a graph of the relative current and running voltage (current, solid circles; voltage, open circles) of a single galvanic cell when connected to a lit red LED, as measured by a multimeter, and as prepared according to the methods disclosed herein.
Figure 2E:
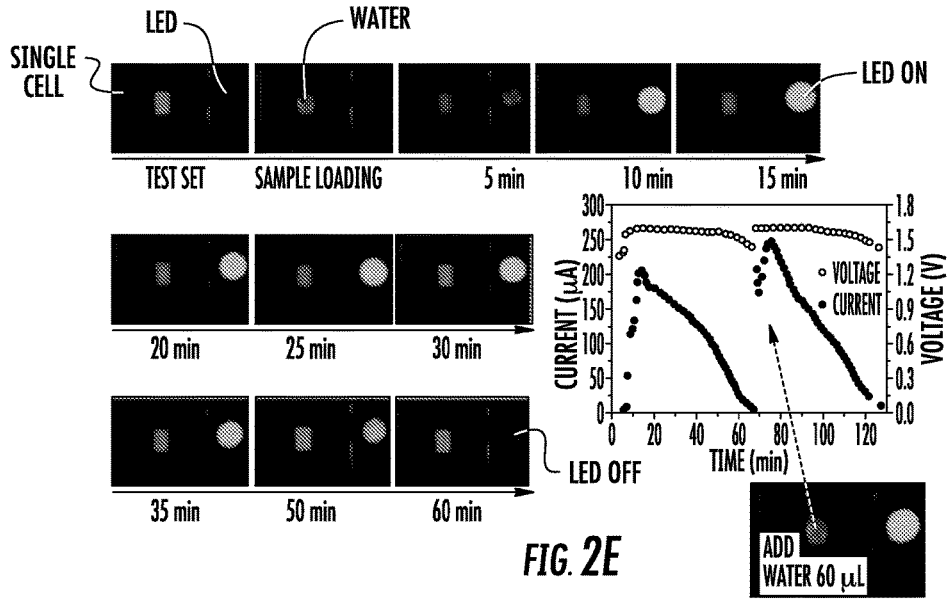
FIG. 2e is a set of digital images and a graph of the relative current and running voltage (current, solid circles; voltage, open circles), wherein another drop of water added at the end of the first hour led to a recovery of the current and red LED was on again.

As shown in FIG. 2b, the open circuit potential of the single galvanic cell was maintained at 2.2 V for 1 h after loading 80 μL of distillated water. FIG. 2c shows a discharge curve with constant current density, 300 μA, for 1 hour (Galvanostatic test). The potential immediately increased after 80 μL of distilled water was loaded to the inlet on the top of paper cell and the potential was maintained at 1.6 V for 1 hour. FIG. 2d shows that a LED, requiring a minimum of 50 μA to light, was successfully lit, and the voltage correspondingly decreased from 1.6V to 1.5±0.1 V, generally as a result of the LED resistance. The voltage and lit light were maintained for 1 hour while the current slowly decreased from about 198 μA to 23 μA. As shown in FIG. 2e, another drop of water was added at the end of the first hour and led to a recovery of the current and lighting of the red LED. The LED was kept lit over the course of over 5 hours by adding individual drops of water as required by the system.

The calculated power density of the single galvanic cell was 3.00 mW/cm² (FIG. 2c).

Example 2

Fluorescence Assay

Referring now to FIG. 3a, fluorescence assays to detect substrates of alkaline phosphatases (ALP) were performed using a paper-based microfluidic device or battery chip 60 comprising a battery 10 (comprising two galvanic cells C1 and C2 with an in-series connection), a surface-mounted UV-LED 66 and fluorescent assay loading and reaction zones 62 and 64, respectively (schematic design provided in FIG. 3a). A piece of transparent polyethylene film 68 covered the top of UV-LED 66. As shown in FIG. 3a, microfluidic device 60 comprises six regions; 1) inlet zone, 2) sample entry, 3) reaction zone, 4) pre-deposited electrolytes, 5) UV-LED/electrode integrated region and 6) bottom hydrophobic region. The assembled paper-based microfluidic chip was 25.60 mm wide×19.20 mm long×2.20 mm thick.

Preparation of Two In-Series Galvanic Cells

Galvanic cells C1 and C2 were generally manufactured following the methods described in Example 1. As shown in FIG. 3a, electrodes 30 and 32 were configured in a single region or fold of paper, alongside UV-LED 66. On the reverse side of each electrode, 30 and 32, the filter paper was connected using a silver pen (CircuitWriter™, Precision Pen silver, CAIG Laboratories, Poway, Calif., United States of America). The electrodes of the battery 10 and of the UV-LED 66 were also connected as appropriate on the reverse side of the filter paper using the silver pen. Wiring between battery 10 and LED 66 was provided to turn on the UV-LED light.

Properties of Two In-Series Galvanic Cells

Figure 3B:
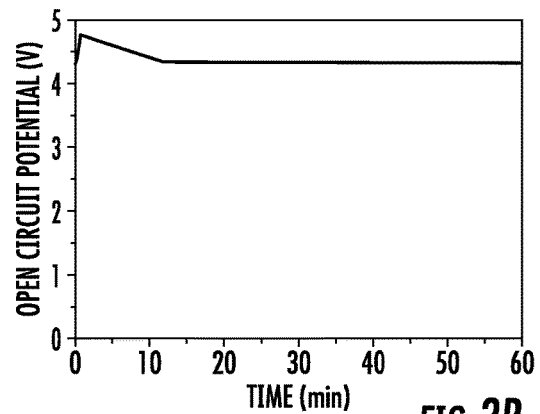
FIG. 3b is a graph of open circuit potential of the battery over the first hour.

As shown in FIG. 3b, upon addition of 160 μL water, the open circuit potential of the two galvanic cell in-series connection (without being connected to the UV-LED) initially increased and then stabilized at 4.30 V (as measured using a Gamry Potentiostat/Galvanostat (Model: Reference 600, software: PWR 800, Gamry Instruments, Warminster, Pa., United States of America)).

Figure 3C:
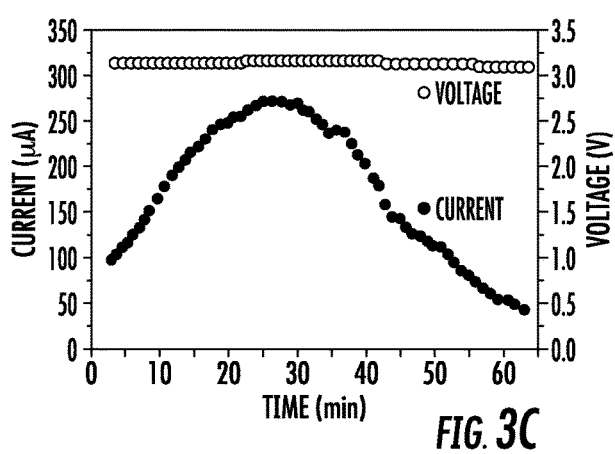
FIG. 3c is a graph of the power-output (current, solid circles and voltage, open circles) from a two galvanic cell in-series connection with a load comprising a surface-mounted UV-LED (A=365 nm).

After connecting to UV-LED 66, upon loading of 160 μL distilled water to the inlet/water zone 16 of battery 10, emission from surface-mounted UV-LED 66 ($\lambda$=365 nm) was observed; current and voltage were measured over time (FIG. 3c). The maximum current was 260 μA, while the voltage remained essentially constant at 3.2 V (maximum power, 0.83 mW).

Fluorescent Assay

The substrate of the phosphatase fluoresces blue with a maximum excitation at 345 nm. Once the substrate's phosphate group is enzymatically removed via reaction with alkaline phosphatase, the resulting product is an intensely fluorescent green precipitate with a maximum emission at 530 nm.

Figure 4:
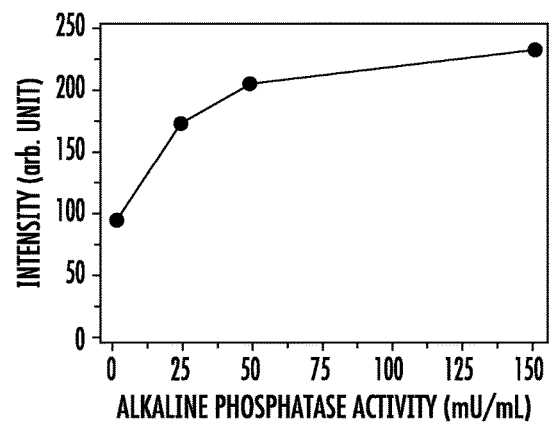
FIG. 4 shows a calibration curve of alkaline phosphatase concentration versus intensity of light emitted as measured by the iPhone application.

A calibration curve was obtained using different alkaline phosphatase concentrations (0, 24, 48, and 150 mU/mL) using a power supply (Fisher Scientific, U33020) to provide constant voltage (3.2 V, the voltage obtained from a chip 60 comprising two galvanic cells C1 and C2 in-series in combination with UV-LED 66 and fluorescence assay loading and reaction zones 62 and 64, as described above). FIG. 4 shows a calibration curve of alkaline phosphatase concentration versus the intensity of light from the LED, as evaluated by Coulor Detector Application for iPhone 4S (Nanospark™ version 1.5, available from Senasys, Altoona, Wisconsin, United States of America). The results show a typical calibration curve, providing a linear region for calibration over an enzymatic concentration range (roughly 50 mU/mL to 150 mU/mL) and quantification.

Experimental Fluorescent Assay

Phosphatase substrate (component A from Life Technologies, ELF 97 Phosphatase detection kit, E6601) was diluted 20-fold in detection buffer (component B from ELF 97 Phosphatase detection kit, E6601, Life Technologies, Carlsbad, Calif., United States of America). Distilled water (160 µL) was added at inlet 16 of the battery chip 60 described above and then 8 µL of phosphatase substrate was added to assay zone 62 over 15 minutes. A picture (iPhone 4S) of assay zone 62 and reaction zone 64 containing the phosphatase substrate was taken and analyzed using the Coulor Detector Application (Nanospark™ version 1.5). Alkaline phosphatase (48 mU/mL) was then loaded onto assay zone 62 and another picture taken of assay zone 62 and reaction zone 64 after the phosphate group of the substrate was removed. The resulting product fluoresced at 530 nm. The results of the color analysis are shown in Table 1.

TABLE 1

RGB analysis of assay zone.

| Colorimetric Analysis | Pale blue light (substrate only— before enzyme) | Green light (substrate after/during exposure to enzyme) |
|---|---|---|
| R | 0 | 105 |
| G | 94 | 193 |
| B | 171 | 105 |

This experiment showed the use of a paper-based microfluidic device 60 to monitor a fluorescent assay using simple handheld technologies, including an iPhone. A paper-based battery 10 comprising two-galvanic cells C1 and C2 connected in-series successfully powered a UV-LED 66 (λ=365 nm), thereby enabling detection of a substrate for alkaline phosphatase based on a color change evaluated using an iPhone 4S.

Example 3

Paper-based Galvanic Cell Fabrication Type II

Wax printing technology was used to fabricate paper-based fluidic galvanic cell devices. A design was created using AutoCAD™ software and then printed onto filter paper using a wax printer (ColorQube 8570, Xerox, Norwalk, Conn., United States of America). The printed devices were placed on a hot plate (123° C.) for about 5 minutes, which caused the wax to permeate throughout the paper, forming the 3-dimensional hydrophobic barriers to control liquid flow.

Affixing Anode/Cathode

A paper-based galvanic cell was prepared using electron beam evaporation. This method of depositing metal on filter paper allowed for a more controlled experimental configuration (See FIG. 5) which contains four (100) or two (200) galvanic cells in-series, where the magnesium electrodes, 130, and the copper electrodes, 120, are arranged in combination with exposed filter paper, 110, which is used to deposit the electrolyte and oxidation agent, as generally described below.

Typically, magnesium was deposited as an anode and copper deposited as a cathode, each using electron-beam evaporation under $1\times10^{-7}$ torr and 8 kV (high voltage) at 1 µm thickness (Physical Vapor Deposition 75, Kurt J. Lesker Company, Pennsylvania, United States of America). This method enabled definition of the electrical connections as well. To limit exposure of the metal particles to their targeted electrode location, other areas on the paper were covered by a paper mask during deposition.

Cell Preparation

Consistent with Example 1, silver nitrate ($AgNO_3$) and magnesium chloride ($MgCl_2$) are deposited onto the hydrophilic zones as electrolyte for each of the half-cells. Barium chromate ($BaCrO_4$), an oxidation agent of magnesium metal, is also deposited in a hydrophilic zone. After each deposition, the filter paper is allowed to dry, generally for 30 minutes at 80° C. The origami paper is folded into its design. Electrical connections between the battery and the external device are added to the system using a silver conductive pen connecting the battery and the power source on the side of the paper opposite the metal electrodes.

Galvanic Cell Performance

Performance of the paper-based fluidic galvanic cell manufactured using electron beam deposition is investigated using a Gamry Potentiostat/Galvanostat (Model: Reference 600, software: PWR 800). All experiments are conducted in an aluminum Faraday cage. Discharge curves of paper-based fluidic galvanic cell are obtained using a constant load of current. The performances for red LED and UV-LED power output are also evaluated. The current and voltage are measured simultaneously using a Fluke 177 True RMB multi-meter (Fluke Corporation Everett, Wash., United States of America).

Example 4

Paper-Based Galvanic Cell Fabrication Type III

A paper-based microfluidic device comprising a battery (twenty galvanic cells in-series connection) is manufactured using screen printing (using, for example, MPM SPM Screen Printer (Precision Placement Machines, Inc., Fremont, New Hampshire, United States of America)) or inkjet circuit printing using for example, MFC-J870DW (Brother International, Bridgewater, N.J., United States of America)) in combination with electron beam deposition as described above.

Screen printing is used to manufacture the wiring and deposit the silver cathode. Screen printing, an approach familiar to those of skill in the art, feeds the substrate, in this case, a filter paper, through the printer. Typically, no wax is necessary to mask the non-target areas, due to the precision of the printer. Alternatively, the required wiring and silver cathode is manufactured using an inject printer in combination with a silver-based toner, for example, AgIC Circuit Printer Cartridge, a Brother LC71 compatible cartridge (AgIC, Bunkyo-ku, Tokyo, Japan).

After application of the silver cathode, a wax mask is applied to the substrate, defining the location of the electrodes, as described above. The magnesium electrode is deposited using electron beam deposition as generally described in Example 3.

Cell Preparation

Consistent with Example 1, silver nitrate ($AgNO_3$) and magnesium chloride ($MgCl_2$) are deposited onto the hydrophilic zones as electrolyte for each of the half-cells. Barium chromate ($BaCrO_4$), an oxidation agent of magnesium metal, is also deposited in the appropriate zone. The origami paper is folded into its design. Electrical connections between the battery and the external device are added to the system as described above.

Example 5

Use in Emergency Power Supply

Performance of the paper-based battery comprising twenty in-series galvanic cells is investigated using a Gamry Potentiostat/Galvanostat (Model: Reference 600, software: PWR 800, Gamry Instruments, Warminster, Pa., United States of America).

A completed device provides power to point of care devices, biochemical alert systems, as well as providing a quick charge to portable devices such as, but not limited to, cell phones and flashlights, as well as wearable alert devices. As devised and disclosed herein, the battery will provide power for the length of time that the applied liquid enables interaction between the electrodes, for example for at least about 30 minutes or at least about 60 minutes. In one embodiment, the batteries presently disclosed can provide power to a device for up to at least about five hours, with the repeated application of an aqueous solution, including water.

Example 6

Shelf-Life

Batteries, as prepared according to the methods of the present application, were stored in an airtight pack or dessicator until use. The shelf-life of a battery was determined by measuring the open current potential values using a Gamry Potentiostat/ Galvanostat (Model: Reference 600, software: PWR 800, Gamry Instruments, Warminster, Pa., United States of America) at each of 10 days and one month and in each case its activity was robust after storage. As long as this battery is kept away from water, it can be maintained indefinitely in long-term storage, for example for up to about 60, up to about 120, up to about 180 or up to about 365 days.

Example 7

Battery for Electrophoresis

Batteries, as prepared according to the methods of the present application, are used as component parts of a paper-based microfluidic device for uses such as the electrophoretic separation of proteins, amino acids, DNA, etc. The batteries provide the high voltage necessary to separate biomolecules for a fixed period of time.

Example 8

Wearable Battery

Batteries, as prepared according to the methods of the present application, can be attached to human body or clothes, providing power for wearable electronic devices.

Incorporation by Reference

The patents and publications listed herein describe the general skill in the art. All publications, patents, and patent applications mentioned in this specification are herein incorporated by reference to the same extent as if each individual publication, patent, or patent application was specifically and individually indicated to be incorporated by reference. In the case of any conflict between a cited reference and this specification, the specification shall control.

In describing embodiments of the present application, specific terminology is employed for the sake of clarity. However, the presently disclosed subject matter is not intended to be limited to the specific terminology so selected. Nothing in this specification should be considered as limiting the scope of the presently disclosed subject matter. All examples presented are representative and non-limiting. The above-described embodiments can be modified or varied, without departing from the presently disclosed subject matter, as appreciated by those skilled in the art in light of the above teachings. It is therefore to be understood that, within the scope of the claims and their equivalents, the presently disclosed subject matter can be practiced otherwise than as specifically described.

What is claimed is:

1. A paper-based battery comprising:
   a paper substrate adapted to receive a liquid; and
   a cell comprising a magnesium anode disposed on the paper substrate and a cathode disposed on the paper substrate;
   wherein the magnesium anode and the cathode are separated from and coplanar with each other, wherein upon application of a liquid to the paper substrate the magnesium anode, the cathode and the liquid are capable of generating an electric current and wherein said battery has a power density of at least about 1 $mW/cm^2$ after application of a liquid.

2. The paper-based battery of claim 1, wherein the paper substrate comprises one or more folds.

3. The paper-based battery of claim 2, wherein the magnesium anode and the cathode are coplanar on a region of the paper substrate bounded by one or more folds.

4. The paper-based battery of claim 2, wherein the folded paper substrate comprises at least three folds.

5. The paper-based battery of claim 1, wherein the paper substrate comprises a hydrophobic zone and a hydrophilic zone.

6. The paper-based battery of claim 1, wherein the paper substrate comprises a zone loaded with an electrolyte.

7. The paper-based battery of claim 6, wherein the zone loaded with electrolyte is in a path of travel of a liquid to the magnesium anode and the cathode.

8. The paper-based battery of claim 6, wherein the electrolyte comprises metal ions corresponding to the cathode and anode, optionally in combination with inorganic salts.

9. The paper-based battery of claim 6, wherein the electrolyte is selected from the group consisting of $MgF_2$, $MgCl_2$, $MgBr_2$, $MgI_2$, $MgClO_4$, $Mg(C_2H_3O_2)_2$, $Mg(HCO_3)_2$ $Mg(OH)_2$, $Mg(MnO_4)_2$, $Mg(ClO_3)_2$, $MgCO_3$, $MgCrO_4$, $MgCr_2O_7$, $MgSO_4$, $Mg_3(PO_4)_2$, $Mg(NO_3)_2$, $AgF$, $AgCl$, $AgBr$, $AgI$, $AgC_2H_3O_2$, $AgHCO_3$, $AgOH$, $AgNO_3$, $AgMnO_4$, $AgClO_3$, $CuF$, $CuCl$, $CuBr$, $CuI$, $CuF_2$, $CuCl_2$, $CuBr_2$, $CuI_2$, $PtCl_2$, $AuCl$, $KCl$, $NaCl$ and combinations thereof.

10. The paper-based battery of claim 1, wherein the cathode comprises a material selected from the group consisting of silver, copper, platinum, gold and carbon-based material.

11. The paper-based battery of claim 10, wherein the carbon-based material comprises a material selected from the group consisting of activated carbon, graphene, carbon nanotubes, carbon paste, glassy carbon paste and glassy carbon.

12. The paper-based battery of claim 1, wherein the paper substrate comprises a zone loaded with an oxidation agent for magnesium metal.

13. The paper-based battery of claim 12, wherein the oxidation agent is selected from the group consisting of $BaCrO_4$, $MnO_2$, $PbO$, $KMnO_4$, $FeO$, $PbCrO_4$, $SnO_2$, $Bi_2O_3$ and combinations thereof.

14. The paper-based battery of claim 1, wherein the liquid comprises water.

15. The paper-based battery of claim 1, wherein the liquid comprises a biological or non-biological fluid or a combination thereof.

16. The paper-based battery of claim 15, wherein the biological fluid is selected from the group consisting of urine, blood-related samples, sputum, cerebral spinal fluid, interstitital fluid, bronchoalveolar lavage, lymph fluid, bone marrow fluid, ascetic fluid, exudative fluid, amniotic fluid, expectorated sputum, saliva, semen, bile, pancreatic fluid and combinations thereof.

17. The paper-based battery of claim 16, wherein the blood-related sample comprises whole blood, serum, or plasma.

18. The paper-based battery of claim 1, wherein the longest dimension of said magnesium anode is no more than about 10 mm.

19. The paper-based battery of claim 1, wherein the battery has an open circuit potential of more than 1.5 V for a single cell.

20. The paper-based battery of claim 1, wherein said battery does not contain a salt bridge.

21. The paper-based battery of claim 1, further comprising a zone for conducting a reaction.

22. The paper-based battery of claim 1, further comprising at least one or more additional cells connected to the first cell in series or in parallel.

23. A device comprising the paper-based battery of claim 1.

24. A method of making a paper-based battery, the method comprising:
   providing a paper substrate adapted to receive a liquid; and
   disposing magnesium and a cathode material on the paper substrate to form a cell comprising a magnesium anode and a cathode;
   wherein the magnesium anode and the cathode are separated from and coplanar with each other, wherein upon application of a liquid to the paper substrate the magnesium anode, the cathode and the liquid are capable of generating an electric current and wherein said battery has a power density of at least about 1 $mW/cm^2$ after application of a liquid.

* * * * *